3,239,548
PROCESS FOR MAKING TETRAETHYL LEAD

Anthony F. Benning, Woodstown, N.J., and Charles A. Sandy, Wilmington, Del., assignors to E. I. du Pont de Nemours and Company, Wilmington, Del., a corporation of Delaware
No Drawing. Filed Jan. 11, 1963, Ser. No. 250,748
8 Claims. (Cl. 260—437)

This invention relates to a process for making tetraethyl lead by ethylating a ternary allow of Pb, Na and K with ethyl chloride and, particularly, to the use therein of small amounts of an ethylation accelerator in combination with certain iodides to improve the specificity of such ethylation reaction.

Tetraethyl lead is commonly manufactured by the reaction of ethyl chloride with monosodium-lead alloy (NaPb) according to the equation $$4EtCl + 4NaPb \rightarrow Et_4Pb + 3Pb + 4NaCl$$

By-products are also normally formed, principally volatile hydrocarbons and high-boiling organolead compounds, by incomplete ethylation and side reactions. A significant and objectionable by-product is hexaethyl dilead. According to Gittins and Mattison in U.S. Patent 2,763,673, tetraethyl lead for gasoline use should contain less than 0.3% of this impurity, but that sometimes it is produced containing much more, e.g. several percent, depending on process conditions. In general, the shorter the reaction time, also the lower the reaction temperature, the higher the hexaethyl dilead content of the product. When the hexaethyl dilead content is objectionably high, the prior art proposes to decrease it by aftertreatment of the ethylation product. However, the use of heat alone or silicaceous catalysts as disclosed by McDyer and Closson in U.S. Patent 2,571,987, carbon catalysts as shown by Gittins and Mattison in U.S. Patent 2,763,-673, or alkyl iodides and bromides as suggested by Krohn and Shapiro in U.S. Patent 2,555,891 to decrease the hexaethyl dilead content of the ethylation product, tend either to be inefficient as well as time consuming or to result simultaneously in significant losses of the tetraethyl lead product.

Also, normally found are high-boiling constituents that can be accumulated as distillation residues, amounting to as high as 5% of the tetraethyl lead produced and analyzing as high as 90–95% organolead, calculated as tetraethyl lead. These high-boilers not only represent a significant yield loss, but also interfere with the recovery of tetraethyl lead because of their solubilizing effect on the latter. For example, in the steam distillation of the reaction mass to recover the tetraethyl lead the high-boilers tend to remain behind with the lead sludge, forming a water-immiscible phase which holds tetraethyl lead and thereby reduces its partial pressure and accordingly its volatility with steam.

In U.S. Patent 2,917,527, Baumgartner and Brace disclose a short contact time ethylation process which, because of its unique combination of high (130° C.–160° C.) temperatures with certain reactant and catalyst ratios, produces tetraethyl lead substantially free of hexaethyl dilead. The high operating temperatures entail relatively high heating costs. Further, since tetraethyl lead tends to decompose at the elevated temperatures employed, it appears that to obtain good yields, contact time and temperature must be carefully coordinated. Lower temperatures would favor the appearance of hexaethyl dilead. Too long contact times would produce tetraethyl lead free of hexaethyl dilead but at substantially reduced yields due to decomposition of the tetraethyl lead. While reaction temperature and contact time can be coordinated and controlled by means of special equipment and attention, the required control is difficult and the cost of these expedients taken together with the high cost of heating tend to make such high temperature processes uneconomical. It would be desirable to be able to effect significant decreases in reaction time or reaction temperature or both without sacrificing yield or quality of the tetraethyl lead product.

In U.S. Patent 2,635,106, Shapiro and DeWitt disclose the preparation of tetraethyl lead by the reaction of ethyl chloride and a ternary alloy of lead, sodium and potassium in the presence of catalysts which are organic compounds soluble in ethyl chloride, contain a C—O, C—N or C—S bond, and (in addition to other specified porperties) have densities less than 1.6. Included as catalysts are substances known also as accelerators of the reaction of ethyl chloride with monosodium lead alloy, exemplified by acetone, chloroacetone, and other ketones, described by Holbrook in U.S. Patent 2,464,397. Shapiro and DeWitt further disclose the effect of certain inorganic substances to improve the yield of tetraethyl lead from the ternary alloy, e.g. aluminum chloride and iodine. They state that, to obtain the advantage of their discovery of the catalytic effect of the above substances, temperatures of from 0° C. to 100° C. should be employed. Such use of the ternary alloy is not entirely satisfactory however in that the presence of potassium tends to reduce alloy reactivity.

An object of this invention is to provide a new and improved process for making tetraethyl lead from ternary alloys of lead, sodium and potassium, efficiently in high yields at high rates of production. Another object is to improve the specificity of the reaction between ethyl chloride and such ternary alloy, thereby promoting the formation of tetraethyl lead at the expense of normally occurring side reactions and undesired products. Still another object is to produce tetraethyl lead having improved quality with respect to contamination by higher boiling organolead by-products. A further object is to provide novel combinations of substances for ethylating sodium-potassium-lead ternary alloys with ethyl chloride, which combination of substances also permits the use of relatively low temperatures at relatively short reaction times without sacrifice in the yield or quality of the tetraethyl lead product. Other objects are to advance the art. Still other objects will appear hereinafter.

The above and other objects may be accomplished by the process for making tetraethyl lead which comprises reacting (a) Ethyl chloride in the liquid phase with
(b) A ternary alloy consisting essentially of about 46 to about 55 atom percent lead, about 0.75 to about 5 atom percent potassium, and sodium in an amount to bring the total to 100 atom percent
(c) In the presence of about 0.05 to about 5 parts by weight of a halogen-free organic ethylation accelerator for each 100 parts of said alloy and
(d) An iodide in an amount to provide about 0.01 to about 1 part by weight of iodine for each 100 parts of said alloy, said iodide being at least one member of the group consisting of
  ($d_1$) A hydrocarbon iodide consisting of 2–8 carbon atoms, 1–2 iodine atoms attached to saturated carbon atoms, and the rest hydrogen atoms, and
  ($d_2$) An alkyl lead iodide of the formula $R_{4-x}PbI_x$ wherein R is an alkyl group of 1–4 carbon atoms and $x$ is an integer of 1–2,
(e) At a temperature in the range of about 60° C. to 150° C.

This invention is based on the discovery that an iodide of the specified class functions synergistically with a halogen-free organic ethylation accelerator to increase the reaction specificity with respect to the formation of tetraethyl lead and to decrease materially the proportions of by-products normally formed in the ethylation reaction. Thereby, tetraethyl lead can be obtained in better yields and in better quality than by existing commercial methods and, usually, with less expenditure of energy. Substantial yield improvements of tetraethyl lead are obtained without concurrent formation of hexaethyl dilead and other high-boiling impurities. The formation of hexaethyl dilead is virtually eliminated at all temperatures and contact times, and the tetraethyl lead product appears to be stabilized against thermal decomposition during the reaction. Savings in energy are reflected by lower temperatures and/or shorter reaction times that may be used for ethylations in the presence of the combination of an ethylation accelerator and an iodide in accord with this invention. The improvement in the quality of the tetraethyl lead product is particularly significant in that it is achieved in situ, i.e. during the course of the ethylation reaction, and therefore additional processing to remove hexaethyl dilead, etc. from the recovered product is unnecessary. The process is easier to control at high temperatures than the process of Baumgartner and Brace in U.S. Patent 2,917,527.

The synergistic effect of the ethylation accelerator and the iodide, as specified, is obtained with ternary alloys of lead, sodium and potassium which are essentially monoalkali metal-lead alloys wherein the proportion of lead ranges from about 46 to about 55 atom percent and that of the two alkali metals combined comprises from about 54 to about 45 atom percent, with the potassium content ranging from about 0.75 to 5 atom percent based on the total alloy. For optimum results, the lead content is kept between 49 and 51 atom percent, particularly close to and just over (about) 50 atom percent, while the potassium content is more usually between 1 and 4.6 atom percent, particularly 2–3 atom percent, the rest being sodium. With a lead content beyond the preferred range, i.e near the extremes of the broad range, the reaction is slower but is relatively clean, producing only small amounts of undesired by-products, as shown by high yield/conversion ratios.

The ternary alloys may be prepared essentially as described in U.S. Patent 2,635,106, for example, by heating a mixture of the three metals to form a melt which is intimately mixed and then resolidified by cooling. Preferably, the molten alloy is rapidly crystallized upon the cold surface of a rotating drum, the lower portion of which dips beneath the surface of the melted alloy, for example as described by Pyk in U.S. Patent 2,561,636; the crystallized alloy being removed from the drum in the form of flakes.

The halogen-free, organic ethylation accelerators that may be employed in this invention are well-known as ethylation accelerators of the reaction of ethyl chloride with the sodium-lead binary alloy. More specifically, the ethylation accelerator may be a halogen-free ketone of U.S. Patent 2,464,397, a halogen-free aldehyde of U.S. Patent 2,515,821, a halogen-free acetal of U.S. Patent 2,477,465, a halogen-free ester of U.S. Patent 2,464,398, a halogen-free amide of U.S. Patent 2,464,399, a halogen-free acid anhydride of U.S. Patent 2,426,598, or a halogen-free alcohol, preferably a lower alkanol (i.e. of 1–4 carbon atoms). A single ethylation accelerator or a mixture of any two or more thereof may be used, as desired. The preferred ethylation accelerator is acetone.

The iodides used in accordance with this invention preferably are hydrocarbon iodides which consist of 2 to 8 carbon atoms, 1 to 2 iodine atoms attached to saturated carbon atoms, preferably carbon atoms of terminal methylene groups, and the rest hydrogen atoms. By a "saturated carbon atom" is meant a carbon atom which is attached to another carbon atom or atoms by a single bond or bonds, and not by an unsaturated (double or triple) bond. The hydrocarbon portion of such iodides may consist of aliphatic, cycloaliphatic and aralkyl hydrocarbon groups, and will carry 1 to 2 iodine atoms. Thus, the hydrocarbon iodides include alkyl iodides, cycloalkyl iodides, alkenyl and alkynyl iodides having at least 3 carbon atoms and at least one saturated carbon atom bearing an iodine atom, cycloalkenyl iodides wherein a saturated carbon carries the iodine atom, aralkyl iodides, and alkylene diiodides. Alkyl iodides are preferred, especially those having densities greater than 1.6 and particularly the primary alkyl iodides of 2 to 4 carbon atoms. It will be noted that the following lower alkyl iodides have densities greater than 1.6, ethyl iodide (1.933), n-propyl iodide (1.743), isopropyl iodide (1.714), n-butyl iodide (1.615) and isobutyl iodide (1.603). Other hydrocarbon iodides that may be used and whose densities exceed 1.6 are cyclohexyl iodide, benzyl iodide, allyl iodide, propargyl iodide, trimethylene diiodide, tetramethylene diiodide, and pentamethylene diiodide. Still other hydrocarbon iodides that may be used are amyl iodide, hexyl iodide, heptyl iodide and otyl iodide. Of the hydrocarbon iodides, ethyl iodide is most preferred.

The alkyl lead iodides of the formula $R_{4-x}PbI_x$ wherein R represents an alkyl group of 1–4 carbon atoms and $x$ is an integer of 1 to 2 are effective iodides in the process of this invention. Of these, triethyl lead iodide and diethyl lead diiodide are preferred.

Mixtures of any two or more iodides may be used, particularly mixtures of ethyl iodide and ethyl lead iodides such as the equimolar mixture of ethyl iodide and triethyl lead iodide which is obtained by treating tetraethyl lead with iodine, preferably in ethyl chloride solution In a preferred embodiment, a solution of the iodide in ethyl chloride, which may also contain the ethylation accelerator, is added to the reactor.

The combination of ethylation accelerator and iodide is effective over a wide range of operating conditions to improve the specificity of the ethylation reaction. No special equipment or changes are required in the mechanical modes known for conducting the ethylation. The ethylation accelerator and the iodide can be introduced to the reactor separately, together, or with any of the reactants at the beginning and during the reaction. The temperature may range broadly from about 60° C. to 150° C., under pressures sufficient to maintain the ethyl chloride in the liquid phase as is conventional and well known in the art. The process can be carried out batchwise or in a continuous manner. In the batch process, the reaction conveniently will be conducted at a temperature of from about 60° C. to about 100° C., preferably from about 80° C. to about 90° C. Also, in the batch process, it usually will be preferred to mix all of the reactants at a temperature in the range of about 25° C. to about 50° C., at which the reaction is initiated, and then heat the mixture rapidly to the higher temperature desired for completion of the reaction, e.g. about 80° C. to about 90° C.

Preferably, the reaction will be carried out continuously, particularly in the manner described by Schlaudecker in U.S. Patent 2,891,977. In the preferred embodiment, the reaction temperatures are those normally considered beyond practicality for batch operation, that is, temperature exceeding 100° C. and preferably ranging from about 110° C. to about 130° C. Such higher temperatures enable the production of tetraethyl lead rapidly and in high yields and conversions.

The ethylation accelerator normally is used in the amounts of from about 0.05 to about 5 parts by weight per 100 parts of the alloy, the optimum proportion depending on the nature of the catalyst and other reaction conditions. Preferably, acetone is used in the range 0.1 to 1 part per 100 parts of the alloy, with the higher proportion, e.g. about 0.4 to about 1.0 part per 100 parts of alloy, preferred at the higher temperatures.

Broadly, the hydrocarbon iodide is used in amounts providing from about 0.01 to about 1 part by weight of iodine for each 100 parts of the alloy. Preferably, this amount corresponds to from about 0.05 to about 0.5 part I/100 parts alloy, and preferably also to from about 0.2 to about 2 parts by weight of I for each part of the ethylation accelerator.

As in existing processes, the quantity of ethyl chloride may be varied greatly, from about 1 up to about 50 molar proportions, based on the alloy. Below 100° C., under batch conditions for example, at least one mole and most usually between 1.5 and 7 moles are used per mole of alloy. At higher temperatures, larger excesses are used, for example about 5 to about 15 moles of ethyl chloride per mole of alloy over the 110° C.–130° C. temperature range. The excess ethyl chloride is of course recovered for reuse, as disclosed in the art, e.g. by distillation, and as such may contain small proportions of tetraethyl lead. A feature of the present invention is to utilize such recycle ethyl chloride containing tetraethyl lead and, by the addition of iodine thereto, prepare in situ ethyl iodide and triethyl lead iodide. If the tetraethyl lead in the ethyl chloride is insufficient to provide the desired quantity of the iodide catalyst, additional (make-up) quantites of iodide can be added to this ethyl chloride feed stream.

It should be noted that the ethylation reaction produces two classes of ethylated lead products, those titratable and those (comprising a minor group) not titratable with iodine. In the first group are the completely organic lead compounds including the tetraalkyl lead and the hexaalkyl dilead classes of organolead compounds which react as follows:

$$R_4Pb + I_2 \rightarrow RI + R_3PbI$$

and $$R_3Pb\text{---}PbR_3 + I_2 \rightarrow 2R_3PbI$$

Incompletely ethylated lead compounds, such as triethyl lead chloride and diethyl lead dichloride, are not iodine-titratable under the analytical conditions used. Neither are they particularly volatile with steam. However, like the completely organic lead compounds, they are soluble in hydrocarbons, and thus, by solvent extraction of the reaction mass, can be determined as part of the total organolead product. The yields reported herein are iodine-titratable yields; accordingly, when (by the method of this invention) hexaethyl dilead and other high-boiling iodine-titratable leads are substantially absent, these values reflect both yield and purity of the tetraethyl lead. In practice, after the ethylation step is completed, the tetraethyl lead is usually recovered by steam distillation of the reaction mass. Under such conditions, part of the hexaethyl dilead (if formed in the ethylation) is destroyed, while the water-soluble (incompletely ethylated lead compounds such as triethyl lead iodide) and some of the high-boiling constituents are left behind in the still pot; thus the product is somewhat purified. Tetraethyl lead, made in accordance with the present invention, is exceptionally low in hexaethyl dilead, high-boilers, and water-soluble lead compounds. Also, tetraethyl lead, recovered by solvent extraction, using hexane, benzene, toluene, liquid ethyl chloride and the like, to dissolve and separate the soluble organic lead compounds, followed by filtration and evaporation of the solvent, shows significantly low levels of all impurities.

The ratio of the iodine titratable yield to the conversion of the alloy, i.e. percent consumed, expressed in the examples as Y/C, illustrates the unexpected result that iodides of the invention effect more efficient use of the reactants to produce tetraethyl lead (at the expense of side reactions and products), that is, increases the specificity of the tetraethylation reaction.

To more clearly illustrate this invention, preferred modes of carrying it into effect, and the advantageous results to be obtained thereby, the following examples are given, in which the parts and the proportions are by weight except where specifically indicated otherwise.

EXAMPLE 1

Following the procedure described by Baumgartner and Brace in U.S. Patent 2,917,454 for effecting short contact time high temperature ethylations, 3 gram portions of ethyl chloride (EtCl), with and without acetone (as ethylation accelerator) and with and without an iodine compound as described below, were heated with 2 gram portions of a 10 or 20 mesh ternary alloy composed of 2.69 atom percent K, 47.27 atom percent Na and 50.04 atom percent Pb, for 10 minutes in a bath held at 120° C. The reaction mixtures were quenched by cooling and analyzed for products. The results are tabulated below in terms of percent yield of tetraethyl lead (TEL), the percent conversion of alloy to reaction products, and the ratio of such yield to such conversion (Y/C) which is a measure of the specificity of the reaction to produce tetraethyl lead.

*Effect of additives on the ethylation of NaKPb ternary alloy with ethyl chloride 10 minutes reaction at 120° C.*

| Runs | Additive, Conc. in Percent Wt. of EtCl | Yield, percent | Conversion, percent | Y/C |
|---|---|---|---|---|
| 1 | None | 6.0 | 8.0 | .75 |
| 158 | 0.38% Acetone a | 92.6 | 97.8 | .947 |
| 191 | 0.60% Chloroacetone a | 1.9 | 4.2 | .452 |
| 10 | 1.19% Iodoacetone a | 18.6 | 24.1 | .772 |
| 192 | 0.84% Iodine a | 0.7 | 2.6 | .269 |
| 22 | 0.32% Acetone plus 0.20% Iodoacetone.b | 90.0 | 94.5 | .952 |
| 4 | 0.38% Acetone plus 0.138% Iodine.b | 89.8 | 94.5 | .950 |
| 2 | 0.38% Acetone plus 0.84% Iodine. | 90.2 | 96.7 | .933 |
| 159 | 0.38% Acetone plus 0.17% Ethyl Iodide.b | 94.2 | 97.6 | .965 | a The comparison is made on an equimolar basis; under these conditions, 0.38% wt. acetone on ethyl chloride corresponds to 0.57% wt. of the alloy.
b The different weight percents supply the same amount of iodine, 0.21 gram I/100 gram alloy.

Thus, chloroacetone and iodine, shown by Shapiro and WeWitt in U.S. Patent 2,635,106 to catalyze the ethyl chloride-ternary alloy reaction at a temperature of 80° C., are actually poisons at 120° C. Also, whereas acetone alone is still quite effective at the higher temperature, iodine ($I_2$), when present along with it, tends to interfere with the alkylation. On the other hand, contrary to expectations, ethyl iodide, as co-additive with the acetone, exerts a significant beneficial effect. Not only is TEL produced in higher yield in the presence of ethyl iodide, but a larger proportion of the alloy is converted to this product at the expense of side products.

EXAMPLE 2

The procedure of Example 1 is repeated on a ternary alloy composed of 1.92 atom percent K, 48.09 atom percent Na and 49.99 atom percent Pb, with acetone and ethyl iodide added to the reaction mixture along with the ethyl chloride in the amounts given below.

*Effect of acetone and ethyl iodide on the reaction of ethyl chloride with NaKPb ternary alloy at 120° C.*

| Runs | Acetone, Wt. Percent in EtCl | Ethyl Iodide, Wt. Percent in EtCl | TEL, Percent Yield | Y/C |
|---|---|---|---|---|
| 129 | None | c 0.17 | 3.0 | .682 |
| 133 | None | d 0.55 | 2.8 | .528 |
| 79 | a 0.38 | None | 90.5 | .922 |
| 130 | b 0.55 | None | 90.9 | .943 |
| 80 | 0.38 | 0.17 | 94.4 | .959 |
| 132 | 0.55 | 0.17 | 92.7 | .965 | a Corresponds to 0.57% wt. of the alloy.
b Corresponds to 0.825% wt. of the alloy.
c Corresponds to 0.21 gram I/100 gram alloy.
d Corresponds to 0.68 gram I/100 gram alloy.

The results show that (1) the ethylation accelerator, acetone, is needed to achieve significant conversions and yields in such short contact time-high temperature ethylation, (2) ethyl iodide alone is impractical, (3) the combination of ethyl iodide with acetone again gives superior results in terms of yield of TEL and the specificity of the reaction to produce TEL. Moreover, the TEL, produced in the presence of the ethyl iodide-acetone combination, is of exceptional quality, being free of hexaethyl dilead and containing only traces (less than 0.5%) of higher-boiling ethylated lead by-products.

EXAMPLE 3

This example compares the use of the acetone-ethyl iodide combination in the ethyl chloride ethylation of ternary alloy with its use in the ethylation of binary alloy. The binary alloy is monosodium lead alloy, composed of 50.0 atom percent Na and 50.0 atom percent Pb. The ternary alloy is composed of 1.92 atom percent K, 48.09 atom percent Na and 49.99 atom percent Pb so that, in effect, 3.84% of the sodium atoms of the binary alloy have been replaced by an equal number of potassium atoms. The procedure is that of Examples 1 and 2 above, and in all runs the acetone and ethyl iodide are introduced as a solution in the ethyl chloride. Results obtained in 3, 5 and 10 minute ethylations at 120° C. are tabulated below.

*Comparison of the use of acetone and acetone+ethyl iodide in the ethylation of binary and ternary alloys at 120° C.*

Acetone conc.=0.38% wt. of EtCl
EtI conc.=0.17% wt. of EtCl when present

| Runs | Alloy | EtI | Reaction Time, Min. | TEL, Percent Yield | Y/C |
|---|---|---|---|---|---|
| 122, 124 | Binary | No | 3 | 82.3 | .895 |
| 121 | do | Yes | 3 | 84.5 | .920 |
| 90 | Ternary | No | 3 | 81.6 | .909 |
| 91 | do | Yes | 3 | 82.3 | .946 |
| 126, 152 | Binary | No | 5 | 86.4 | .899 |
| 127 | do | Yes | 5 | 89.0 | .926 |
| 86 | Ternary | No | 5 | 87.8 | .918 |
| 87 | do | Yes | 5 | 92.7 | .953 |
| 131 | Binary | No | 10 | 89.3 | .905 |
| 132 | do | Yes | 10 | 91.5 | .928 |
| 79 | Ternary | No | 10 | 90.5 | .922 |
| 80 | do | Yes | 10 | 94.4 | .959 |

It will be noted that the use of the ternary alloy, according to the method of this invention, results in consistently higher reaction specificities (Y/C), and only in the 3 minute reaction is a lower yield of TEL obtained from the ternary alloy than from the binary alloy.

It should be noted too that ethyl iodide alone is superior to acetone alone in its ability to bring about the EtCl ethylation of the NaPb binary alloy at 120° C. However, the data in the above Examples 1 and 2 indicate that, under conditions that are otherwise the same, ethyl iodide alone (like molecular iodine alone) tends to poison the reaction of EtCl with the NaKPb ternary alloy. Thus, the marked beneficial interaction of the iodide with the ethylation accelerator in the ternary alloy reaction is even more unexpected and unobvious from the art of Shapiro et al. in U.S. Patent 2,635,106.

EXAMPLE 4

In this example, a variety of ternary alloy compositions are alkylated according to the method of this invention and under the conditions described in the preceding examples. Typical results are summarized in the table below.

*Reaction of various ternary alloys with ethyl chloride containing acetone (0.38% wt.) and ethyl iodide (0.17% wt.) 10 minute reaction at 120° C.*

| Runs | Alloy Composition Atom Percent | | | EtI present | TEL, Percent Yield | Y/C |
|---|---|---|---|---|---|---|
| | K | Na | Pb | | | |
| 66 | 0.98 | 52.28 | 46.74 | No | 85.5 | .876 |
| 67 | | | | Yes | 89.7 | .914 |
| 58 | 1.07 | 48.62 | 50.31 | No | 89.8 | .914 |
| 59 | | | | Yes | 93.1 | .945 |
| 54 | 2.18 | 47.12 | 50.70 | No | 92.2 | .949 |
| 58 | | | | Yes | 94.2 | .965 |
| 62 | 2.94 | 41.89 | 55.16 | No | 70.2 | .926 |
| 63 | | | | Yes | 71.6 | .951 |
| 92, 95 | 4.59 | 45.42 | 49.98 | No | 91.8 | .938 |
| 93, 96 | | | | Yes | 93.8 | .951 |
| 64 | 7.29 | 45.99 | 46.76 | No | 64.9 | .828 |
| 65 | | | | Yes | 61.8 | .858 |

The last two runs (64 and 65) are outside the scope of this invention. They show, when compared with the first two runs (66 and 67) for example, that increasing the proportion of potassium at the expense of sodium beyond the specified limits leads to decreased alloy reactivity and loss of the yield benefit. The data also show that increasing or decreasing the proportion of lead materially from 50 atom percent leads to less reactive alloys, however such alloys respond favorably to the combination of ethylation accelerator and iodide, as exemplified above, within the specified limits of alloy composition (runs 66, 67 and 62, 63).

Runs 62 and 63 further show that, even though the TEL yield is relatively low after 10 minutes of reaction, the reaction is rather clean as indicated by the Y/C data. With this alloy, both Y and Y/C are improved in the method of the invention, whereas with high K-content alloy of runs 64 and 65 the yields are low (and not improved by iodide) and TEL formation is accompanied by side reactions to a greater degree (lower Y/C). The 55.16% Pb alloy of 62, 63 differs in performance from the 49.98% alloy of the 92, 95 and 93, 96 runs in that it forms TEL at a slower rate; it reacts as cleanly however (comparing Y/C data) which means higher yields could be expected at longer reaction times.

EXAMPLE 5

This example illustrates the superior results obtainable by the use of an ethylation accelerator and an iodide as specified under conditions of time and temperature characterizing batch operation in the manufacture of tetraethyl lead. The ternary alloy employed consists of 1.92 atom percent K, 48.09 atom percent Na and 49.99 atom percent Pb. The ethylation accelerator is acetone, added with the ethyl chloride and amounting to 0.1% wt. thereof. The iodide reaction specificity improper is ethyl iodide, also added with the ethyl chloride and constituting 0.17% wt. thereof. Three parts by weight of the ethyl chloride solution are mixed with 2 parts by weight of the alloy at room temperature (25° C.) at which the reaction is initiated, the mixture is rapidly heated in a bath to 85° C. and held at 85° C. for one hour, then cooled and analyzed. the yield of TEL is 92.1% and the yield/conversion ratio is 0.952. In the absence of the iodide, the yield and the yield/conversion ratio are lower, 91.1% and 0.934, respectively.

The same relative order of results is obtained if the reaction mixture is first heated from 25° C. to 85° C. in 20 minutes, then held at 85° C. for one hour. With no iodide, the yield is 85.9% and Y/C is 0.898. With the iodide, the yield is 87.6% and Y/C is 0.910.

EXAMPLE 6

The procedure of Example 5 is employed. To 2 parts alloy, composed of 4.53 atom percent K, 45.45 atom percent Na and 50.02 atom percent Pb, there is added 3.93 parts ethyl chloride containing 0.1% wt. acetone and 0.17% wt. ethyl iodide. The reaction time is 2 hours at 85° C. The yield of TEL is 95.2% and the yield/conversion ratio 0.959. In the absence of the iodide, the yield is 94.4% and the yield/conversion ratio 0.946.

EXAMPLE 7

The procedure of Example 1 is followed. The alloy is that described in Example 2. The ethyl chloride contains 0.38% wt. of acetone and 0.44% wt. of triethyl lead iodide (to provide about 0.2 gram I/100 gram alloy). The yield of TEL is 95.7% and the yield-conversion ratio 0.972. Without the iodide present, the yield and yield/conversion values are 90.5 and 0.922 (run 79 of Example 2).

Substantially the same relative order of results may be obtained in any of the above examples by employing other ternary alloys consisting essentially of lead, sodium and potassium and wherein the Pb content is of the order of 46 to 55 atom percent, the potassium content between about 0.75 and 5.0 atom percent, the rest being sodium.

Substantially the same relative order of results may be obtained in any of the above examples on employing, in place of acetone, any other halogen-free ketone of U.S. Patent 2,464,397 or an alcohol such as ethanol, 1-propanol, 2-propanol, tert.butyl alcohol, and 2-phenylethanol. Also, there may be used other halogen-free accelerators of the ethyl chloride reaction with sodium lead binary alloy, as described in the U.S. patents referred to earlier, namely 2,515,821, 2,477,465, 2,464,398, 2,464,399, and 2,426,598.

Substantially the same relative order of results may be obtained on employing in place of ethyl iodide in the above examples an equimolar quantity of an iodide as specified hereinbefore, for example, n-propyl iodide, isobutyl iodide, n-amyl iodide, cyclohexyl iodide, trimethylene diiodide, pentamethylene diiodide, or any of the other iodides mentioned earlier.

It will be apparent, from the processes and results described above, that the present use of iodides differs materially from previously suggested uses of iodine-containing substances in tetraethyl lead technology.

It will be understood that the foregoing examples have been given for illustrative purposes solely, and that this invention is not limited to the specific embodiments described therein. On the other hand, it will be readily apparent to those skilled in the art that, subject to the limitations set forth in the general description, variations can be made in the ethylation accelerators, the iodides, the proportions, and the conditions employed, without departing from the spirit or scope of this invention.

From the preceding description, it will be apparent that this invention provides a materially improved process for making tetraethyl lead. Due to the combination of the ternary alloy, the halogen-free organic ethylation accelerator and the iodides of the class disclosed, there is obtained tetraethyl lead in better yields and better quality, essentially free of hexaethyl dilead and other high-boiling impurities and in short reaction times. Thereby, the tetraethyl lead is produced at higher production rates and usually with the elimination of the purification methods previously required for removal of hexaethyl dilead and other high-boiling impurities, resulting in substantial economies. Furthermore, the process is easier to control than previous high temperature processes, whereby the process of this invention becomes economically feasible. Accordingly, it will be apparent that this invention constitutes a valuable advance in and contribution to the art.

The embodiments of the invention in which an exclusive property or privilege is claimed are defined as follows:

1. The process for making tetraethyl lead which comprises reacting
    (a) ethyl chloride in the liquid phase with
    (b) a ternary alloy consisting essentially of about 50 atom percent lead, about 2 to about 3 atom percent potassium, and sodium in an amount to bring the total to 100 atom percent
    (c) in the presence of about 0.1 to about 1 part by weight of acetone for each 100 parts of said alloy and
    (d) an alkyl lead iodide of the formula $R_{4-x}PbI_x$ wherein R is an alkyl group of 1–4 carbom atoms and $x$ is an integer of 1–2, in an amount to provide about 0.05 to about 0.5 part by weight of iodine for each 100 parts of said alloy,
    (e) at a temperature in the range of about 80° C. to about 130° C.

2. The process for making tetraethyl lead which comprises reacting
    (a) ethyl chloride in the liquid phase with
    (b) a ternary alloy consisting essentially of about 50 atom percent lead, about 2 to about 3 atom percent potassium, and sodium in an amount to bring the total to 100 atom percent
    (c) in the presence of about 0.1 to about 1 part by weight of acetone for each 100 parts of said alloy and
    (d) an iodide in an amount to provide about 0.05 to about 0.5 part by weight of iodine for each 100 parts of said alloy, said iodide being a substantially equimolar mixture of ethyl iodide and triethyl lead iodide,
    (e) in the presence of about 0.1 to about 1 part by about 130° C.

3. The process for making tetraethyl lead which comprises reacting
    (a) ethyl chloride in the liquid phase with
    (b) a ternary alloy consisting essentially of about 46 to about 55 atom percent lead, about 0.75 to about 5 atom percent potassium, and sodium in an amount to bring the total to 100 atom percent
    (c) in the presence of about 0.05 to about 5 parts by weight of a halogen-free ketone which is an ethylation accelerator for each 100 parts of said alloy and
    (d) an iodide in an amount to provide about 0.01 to about 1 part by weight of iodine for each 100 parts of said alloy, said iodide being at least one member of the group consisting of
        ($d_1$) a hydrocarbon iodide consisting of 2–8 carbon atoms, 1–2 iodine atoms attached to saturated carbon atoms, and the rest hydrogen atoms, and
        ($d_2$) an alkyl lead iodide of the formula $R_{4-x}PbI_x$ wherein R is an alkyl group of 1–4 carbon atoms and $x$ is an integer of 1–2,
    (e) at a temperature in the range of about 60° C. to 150° C.

4. The process for making tetraethyl lead which comprises reacting
    (a) ethyl chloride in the liquid phase with
    (b) a ternary alloy consisting essentially of about 49 to about 51 atom percent lead, about 1 to about 4.6 atom percent potassium, and sodium in an amount to bring the total to 100 atom percent
    (c) in the presence of about 0.1 to about 1 part by weight of a halogen-free ketone which is an ethylation accelerator for each 100 parts of said alloy and
    (d) an iodide in an amount to provide about 0.05 to about 0.5 part by weight of iodine for each 100 parts of said alloy, said iodide being at least one hydrocarbon iodide consisting of 2–8 carbon atoms, 1–2 iodine atoms attached to saturated carbon atoms, and the rest hydrogen atoms,
    (e) at a temperature in the range of about 80° C. to about 130° C.

5. The process for making tetraethyl lead which comprises reacting
    (a) ethyl chloride in the liquid phase with
    (b) a ternary alloy consisting essentially of about 49 to about 51 atom perment lead, about 1 to about 4.6 atom percent potassium, and sodium in an amount to bring the total to 100 atom percent (c) in the presence of about 0.1 to about 1 part by weight of a halogen-free ketone which is an ethylation accelerator for each 100 parts of said alloy and
(d) a primary alkyl iodide of 2-4 carbon atoms in an amount to provide about 0.05 to about 0.5 part by weight of iodine for each 100 parts of said alloy,
(e) at a temperature in the range of about 80° C. to about 130° C.

6. The process for making tetraethyl lead which comprises reacting
(a) ethyl chloride in the liquid phase with
(b) a ternary alloy consisting essentially of about 49 to about 51 atom percent lead, about 2 to about 3 atom percent potassium, and sodium in an amount to bring the total to 100 atom percent
(c) in the presence of about 0.4 to about 1 part by weight of acetone for each 100 parts of said alloy and
(d) ethyl iodide in an amount to provide about 0.01 to about 1 part by weight of iodine for each 100 parts of said alloy,
(e) at a temperature in the range of about 110° C. to about 130° C.

7. The process for making tetraethyl lead which comprises reacting
(a) ethyl chloride in the liquid phase with
(b) a ternary alloy consisting essentially of about 50 atom percent lead, about 2 to about 3 atom percent potassium, and sodium in an amount to bring the total to 100 atom percent
(c) in the presence of about 0.1 to about 1 part by weight of acetone for each 100 parts of said alloy and
(d) triethyl lead iodide in an amount to provide about 0.01 to about 1 part by weight of iodine for each 100 parts of said alloy,
(e) at a temperature in the range of about 80° C. to about 130° C.

8. The process for making tetraethyl lead which comprises reacting
(a) ethyl chloride in the liquid phase with
(b) a ternary alloy consisting essentially of about 46 to about 55 atom percent lead, about 0.75 to about 5 atom percent potassium, and sodium in an amount to bring the total to 100 atom percent
(c) in the presence of about 0.05 to about 5 parts by weight of acetone and
(d) an iodide in an amount to provide about 0.01 to about 1 part by weight of iodine for each 100 parts of said alloy, said iodide being at least one member of the group consisting of
  ($d_1$) an alkyl iodide of 2-4 carbon atoms, and
  ($d_2$) an alkyl lead iodide of the formula $R_{4-x}PbI_x$ wherein R is an alkyl group of 1-4 carbon atoms and $x$ is an integer of 1-2,
(e) at a temperature in the range of about 80° C. to about 130° C.

References Cited by the Examiner

UNITED STATES PATENTS

| | | | |
|---|---|---|---|
| 2,414,058 | 1/1947 | Pearsall | 260—437 |
| 2,635,106 | 4/1953 | Shapiro et al. | 260—437 |

TOBIAS E. LEVOW, *Primary Examiner*.